(12) United States Patent
Shingyoji

(10) Patent No.: US 11,933,904 B2
(45) Date of Patent: Mar. 19, 2024

(54) EPHEMERIS POSITIONING PROCESS AND INFORMATION PROCESSING DEVICE

(71) Applicant: CASIO COMPUTER CO., LTD., Tokyo (JP)

(72) Inventor: Ryuji Shingyoji, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 174 days.

(21) Appl. No.: 17/472,018

(22) Filed: Sep. 10, 2021

(65) Prior Publication Data

US 2022/0091273 A1    Mar. 24, 2022

(30) Foreign Application Priority Data

Sep. 24, 2020  (JP) ................................ 2020-159190
Jan. 19, 2021  (JP) ................................ 2021-006174

(51) Int. Cl.
G01S 19/05    (2010.01)
G01S 19/08    (2010.01)
G01S 19/19    (2010.01)
G01S 19/25    (2010.01)

(52) U.S. Cl.
CPC .............. *G01S 19/05* (2013.01); *G01S 19/08* (2013.01); *G01S 19/19* (2013.01); *G01S 19/258* (2013.01)

(58) Field of Classification Search
CPC ........ G01S 19/19; G01S 19/258; G01S 19/05; G01S 19/08; G01S 19/14; G01S 19/27
See application file for complete search history.

(56) References Cited

U.S. PATENT DOCUMENTS 6,560,534 B2 *  5/2003  Abraham ................ G01S 19/27
                                                    701/484
7,342,533 B2 *  3/2008  Rotman ................ G01S 19/258
                                                    342/357.73

(Continued)

FOREIGN PATENT DOCUMENTS

JP    2013-195324 A    9/2013
JP    2014182119 A     9/2014

(Continued)

OTHER PUBLICATIONS

1 Notice of Reasons for Refusal dated Nov. 15, 2022 received in Japanese Patent Application No. JP 2021-006174.

*Primary Examiner* — Cassi J Galt
(74) *Attorney, Agent, or Firm* — SCULLY SCOTT MURPHY & PRESSER, PC

(57) ABSTRACT

A processor determines whether the remaining period until the expiration time of predicted ephemerides, which are predicted orbital information on navigation satellites, is a determination period or shorter. The determination period is set to at least the maximum term during which a subject is expected to be in a certain state. The processor causes an operation of acquiring actual ephemerides, which are actual orbital information on the navigation satellites, to be executed based on the positioning signals received when determination is made that the remaining period until the expiration time of the predicted ephemerides is the determination period or shorter, and determines the position of the subject based on the actual ephemerides acquired through the actual ephemeris acquiring operation.

9 Claims, 7 Drawing Sheets

(56) References Cited

U.S. PATENT DOCUMENTS

| | | | | |
|---|---|---|---|---|
| 7,436,357 B2 * | 10/2008 | Wang | ..................... | G01S 19/34 |
| | | | | 342/357.74 |
| 2014/0002304 A1 * | 1/2014 | Wei | ........................ | G01S 19/27 |
| | | | | 342/357.66 |
| 2014/0293059 A1 * | 10/2014 | Park | ..................... | H04W 4/029 |
| | | | | 348/158 |

FOREIGN PATENT DOCUMENTS

| JP | 2017-173097 A | | 9/2017 | | |
|---|---|---|---|---|---|
| WO | WO-2015122150 A1 * | | 8/2015 | ............. | G01S 19/19 |

* cited by examiner

DETERMINATION PERIOD SETTING TABLE

| STATE OF USER TO BE SUBJECT TO POSITIONING PROCESS | DETERMINATION PERIOD |
|---|---|
| ULTRAMARATHON (100 km) | 20 HOURS |
| FULL MARATHON | 8 HOURS |
| HALF MARATHON | 4 HOURS |
| 10-km MARATHON | 2 HOURS |
| 5-km MARATHON | 1 HOUR |

EPHEMERIS POSITIONING PROCESS AND INFORMATION PROCESSING DEVICE

CROSS-REFERENCE TO RELATED APPLICATION

This application claims the benefit of Japanese Patent Application No. 2020-159190, filed on Sep. 24, 2020, and Japanese Patent Application No. 2021-006174 filed on Jan. 19, 2021, the entire disclosure of which is incorporated by reference herein.

FIELD

This application relates to an information processing device, a positioning method, and a recording medium.

BACKGROUND

For a positioning process, a global positioning system (GPS) receiving device is required to decode GPS signals transmitted from GPS satellites and thereby acquire ephemerides (hereinafter referred to as "actual ephemerides"), which are actual orbital information on the GPS satellites. The positioning process takes approximately several minutes from the activation of the GPS receiving device due to a time necessary for acquisition of the actual ephemerides. The actual ephemerides have a predefined period of validity of approximately four hours. If the actual ephemerides expire after acquisition, the GPS receiving device has to acquire actual ephemerides again.

Some techniques to reduce the time necessary for the positioning process and extend the period of validity of the ephemerides have been known (for example, Unexamined Japanese Patent Application Publication No. 2013-195324). In these techniques, long-term predicted data on ephemerides (hereinafter referred to as "predicted ephemerides") are downloaded from a server on a network and used in the positioning process, so that a GPS receiver is able to conduct the positioning process rapidly for a long term of approximately one month. The predicted ephemerides are predicted data and will be gradually deviated from the original orbital information as the time passes from the date of acquisition of the predicted ephemerides, leading to a reduction in the accuracy of the positioning process. The predicted ephemerides therefore have a predefined term of validity of approximately three days after the date of distribution from the server, in general.

SUMMARY

An information processing device according to an aspect of the disclosure, which is capable of being carried by a subject, includes at least one processor that executes a program stored in at least one memory, and an antenna that receives positioning signals for a positioning process from navigation satellites. The at least one processor acquires, based on the received positioning signals, actual ephemerides that are actual orbital information on the navigation satellites. The at least one processor acquires predicted ephemerides that are predicted orbital information on the navigation satellites and have a predefined expiration time. The at least one processor determines whether the remaining period until the expiration time is a determination period or shorter, which is set to at least the maximum term during which the subject is expected to be in a certain state. The at least one processor executes an actual ephemeris acquiring operation based on the positioning signals received when determination is made that the remaining period until the expiration time is the determination period or shorter, and determines the position of the subject based on the actual ephemerides acquired through the actual ephemeris acquiring operation.

BRIEF DESCRIPTION OF THE DRAWINGS

A more complete understanding of this application can be obtained when the following detailed description is considered in conjunction with the following drawings, in which.

DETAILED DESCRIPTION

Figure 1:
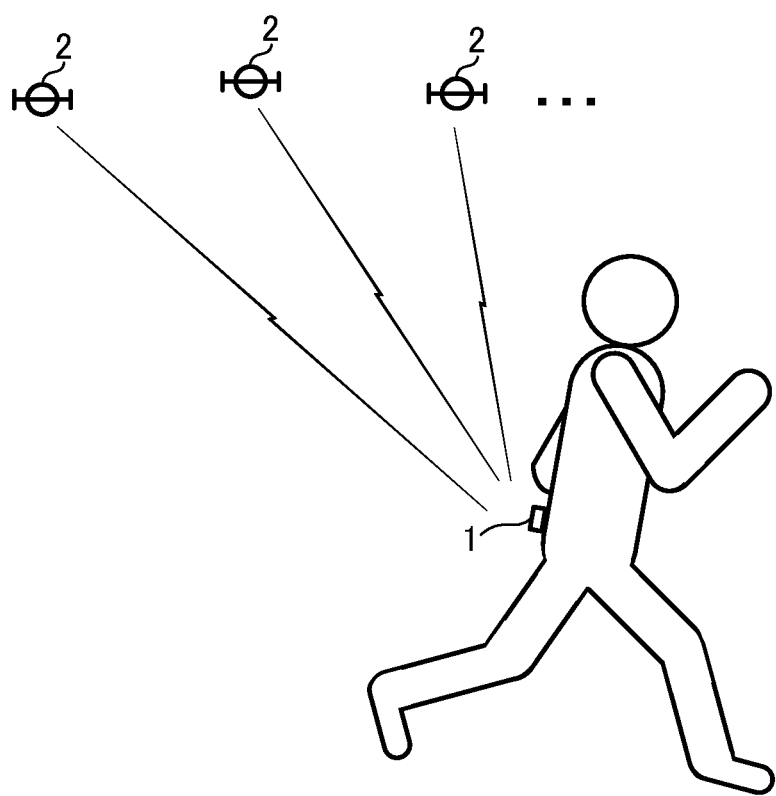
FIG. 1 illustrates exemplary use of an information processing device according to an embodiment of the disclosure.

An embodiment of the disclosure will now be described in detail with reference to the accompanying drawings. In the drawings, the components identical or corresponding to each other are provided with the same reference symbol.

Figure 2:
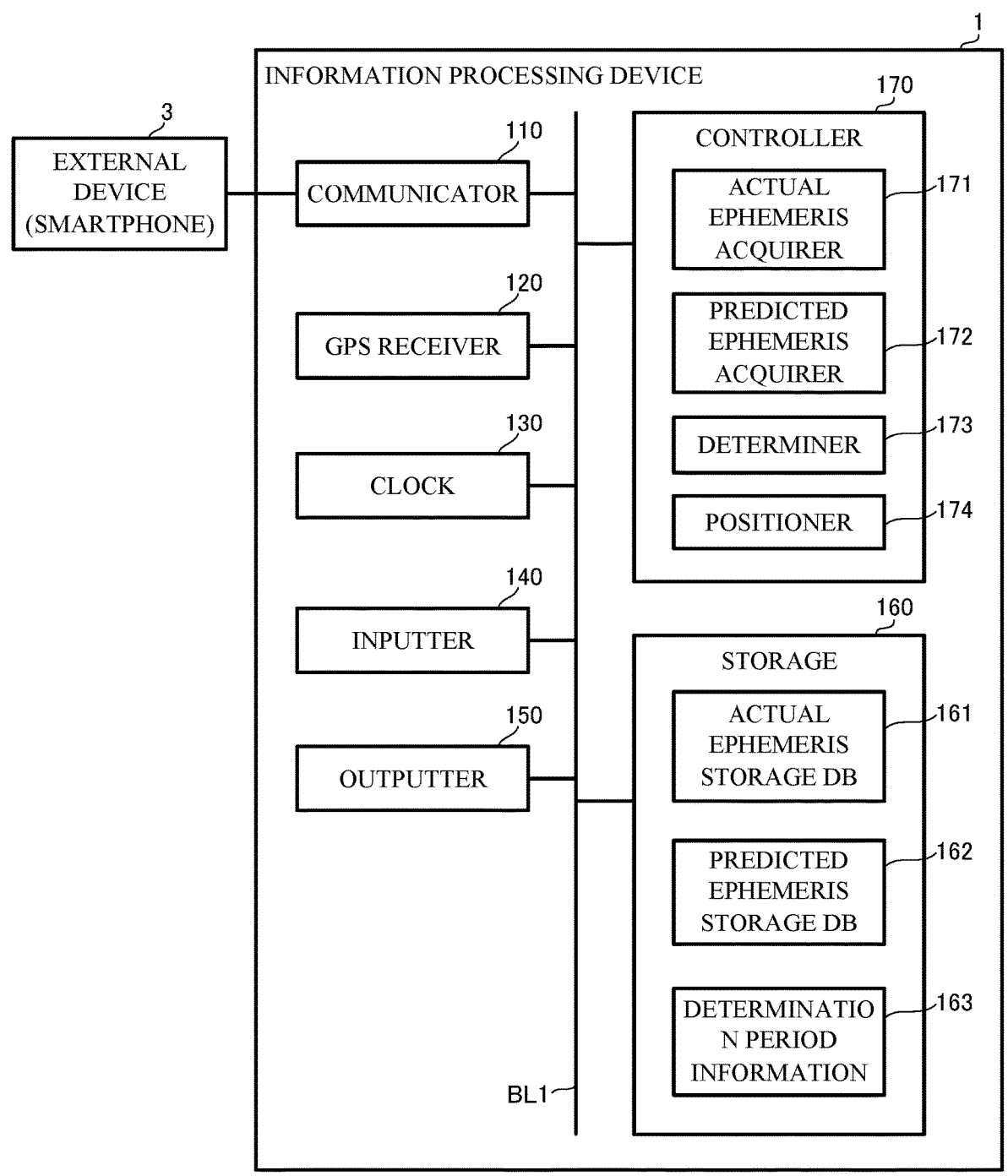
FIG. 2 is a block diagram illustrating a configuration of the information processing device according to the embodiment of the disclosure.

As illustrated in FIG. 1, an information processing device 1 according to the embodiment of the disclosure is worn at the waist of a user, which is a subject, for example. The information processing device 1 acquires location information on the user (determines the position of the user) based on GPS signals, which are positioning signals for a positioning process, transmitted from a plurality of GPS satellites 2 serving as navigation satellites. The information processing device 1 is mainly designed for determination of the position of a user participating in a full marathon race. As illustrated in FIG. 2, the information processing device 1 is equipped with a communicator 110, a GPS receiver 120, a clock 130, an inputter 140, an outputter 150, a storage 160, and a controller 170. These components are electrically connected to each other via bus lines BL1. The information processing device 1 may also be worn at a body part of the user other than the waist (for example, a wrist or ankle). The information processing device may also a device to be carried by a user (for example, a mobile phone, a smartphone, or the like).

The communicator 110 is an interface for communication with an external device 3, such as smartphone, via near field wireless communication, such as Bluetooth (registered trademark). For example, predicted ephemerides, which will be described below, are acquired from the external device 3 via the communicator 110. The communicator 110 may also be an interface for wired communication, such as USB.

The GPS receiver 120 includes a GPS receiving antenna, which is not shown. The GPS receiver 120 captures and receives GPS signals transmitted from the individual GPS satellites 2. The GPS signal received from each GPS satellite 2 contains an actual ephemeris that is actual orbital information on the GPS satellite 2, time information that indicates the exact time of transmission of the GPS signal, and an almanac that is summarized orbital information on all the GPS satellites 2, for example. The contents (parameters; true anomaly and the like) of data including the actual ephemeris and the almanac are not described in detail in this specification because the contents have been well known, as is disclosed in the non-patent literature "Takeyasu Sakai (Electronic Navigation Research Institute). Jan. 7, 2020. Basic Knowledge of GPS/GNSS", for example.

The clock 130 includes a crystal oscillator, for example. The clock 130 uses a basic clock signal generated at the crystal oscillator and thereby exactly measures the current date and current time in a region including the information processing device 1, with respect to the coordinated universal time (UTC). The current date and time may also be measured by the controller 170 by means of software, instead of the clock 130.

The inputter 140 includes various switches and buttons. The inputter 140 receives manipulation from the user and outputs a signal corresponding to the received manipulation to the controller 170. For example, the inputter 140 receives an instruction to initiate the positioning process and an instruction to terminate the positioning process from the user.

The outputter 150 includes a liquid-crystal display panel or an organic electroluminescence (EL) display panel and a power source lamp, for example. The outputter 150 displays a screen for showing a result of the positioning process, for example. Alternatively, the outputter 150 may transmit information indicating a result of the positioning process to the external device 3 via the communicator 110, and the external device 3 may display a screen for showing the result of the positioning process.

The storage 160 is a rewritable non-volatile storage device, such as flash memory or hard disk drive. The storage 160 stores various programs executed at the controller 170 and various types of data. For example, the storage 160 stores an actual ephemeris storage database (DB) 161, a predicted ephemeris storage DB 162, and determination period information 163.

The actual ephemeris storage DB 161 stores actual ephemerides, which are actual orbital information on the individual GPS satellites 2, in association with date-and-time information indicating the expiration time of the actual ephemerides. In this embodiment, the period of validity of each actual ephemeris available in the positioning process for the subject is four hours (two hours before and after the epoch time contained in the actual ephemeris), for example. That is, the time approximately two to four hours after the time of reception of the GPS signals containing the actual ephemerides is set as the expiration time. It should be noted that the actual ephemerides are updated in a cycle of two hours in the individual GPS satellites 2. The expiration time is set based on the current time measured at the clock 130. The actual ephemerides beyond the expiration time cannot be used in the positioning process because of the insufficient accuracy. The actual ephemeris storage DB 161 may also be included in the GPS receiver 120.

The predicted ephemeris storage DB 162 stores predicted ephemerides, which are long-term predicted orbital information on the individual GPS satellites 2, in association with the date-and-time information indicating the expiration time of the predicted ephemerides. In this embodiment, the period of validity of each predicted ephemeris available in the positioning process for the subject is longer than the period of validity of the actual ephemeris, and is three days, for example. That is, the expiration time is set to 24 o'clock (UTC) three days after the date of distribution of the predicted ephemerides from the server, serving as a below-described external apparatus, for example. The predicted ephemerides beyond the expiration time cannot be used for the positioning process because of the insufficient accuracy. The content (parameters) of each predicted ephemeris is substantially identical to the content (parameters) of each actual ephemeris. The number of the predicted ephemerides is larger than that of the actual ephemerides because the predicted ephemerides has a longer period of validity. The predicted ephemeris storage DB 162 may also be included in the GPS receiver 120.

The determination period information 163 indicates a determination period for determining whether the actual ephemerides or the predicted ephemerides are to be used in the positioning process at a below-described positioner 174. In this embodiment, the determination period is set to eight hours, calculated by adding one hour to seven hours corresponding to an expected maximum term (time limit) of a full marathon to be participated in by the user, for example. The determination period is shorter than the period of validity of the predicted ephemerides and longer than the period of validity of the actual ephemerides. The determination period is thus set to a period in association with a behavior of the subject in the positioning process. The length of the determination period may be appropriately varied, provided that the determination period is at least the above-mentioned maximum term.

The controller 170 includes a central processing unit (CPU) corresponding to at least one processor, a read only memory (RAM) and a random access memory (RAM) corresponding to at least one memory, for example, although these components are not shown. The CPU uses the RAM as a working memory and appropriately executes various programs stored in the ROM and the storage 160, thereby controlling the above-described components. The controller 170 has a functional configuration according to the disclosure, which includes an actual ephemeris acquirer 171, a predicted ephemeris acquirer 172, a determiner 173, and the positioner 174.

The actual ephemeris acquirer 171 decodes the GPS signals received (captured) at the GPS receiver 120 from the individual GPS satellites 2 and thus acquires actual ephemerides. The actual ephemeris acquirer 171 then stores the acquired actual ephemerides into the actual ephemeris storage DB 161 together with the date-and-time information indicating the expiration time of the actual ephemerides. If the actual ephemerides stored in the actual ephemeris storage DB 161 expire, or if no valid predicted ephemeris is stored in the predicted ephemeris storage DB 162 at the start of the positioning process, or if the remaining period from the current time until the expiration time of the predicted ephemerides is the determination period or shorter, the actual ephemeris acquirer 171 acquires the actual ephemerides. The actual ephemeris acquirer 171 may also be included in the GPS receiver 120.

The predicted ephemeris acquirer 172 acquires predicted ephemerides from the server via the external device 3, and then stores the acquired predicted ephemerides into the predicted ephemeris storage DB 162 together with the date-and-time information indicating the expiration time of the predicted ephemerides. This server manages predicted ephemerides and distributes the predicted ephemerides to the external device 3 at regular intervals. The predicted ephemerides may also be acquired from an appropriate external apparatus other than the server. The timing of acquisition of the predicted ephemerides at the predicted ephemeris acquirer 172 is identical to the timing when the information processing device 1 becomes communicable with the external device 3, for example. At this timing, the predicted ephemerides stored in the predicted ephemeris storage DB 162 are updated to the latest predicted ephemerides.

The determiner 173 determines whether the positioner 174 should use the predicted ephemerides or the actual ephemerides in the positioning process. Specifically, the determiner 173 determines whether the remaining period from the current time until the expiration time of the predicted ephemerides stored in the predicted ephemeris storage DB 162 is equal to or shorter than the determination period indicated by the determination period information 163 stored in the storage 160. If the determiner 173 determines that the remaining period from the current time until the expiration time of the predicted ephemerides is the determination period or shorter, then the positioner 174 causes the GPS receiver 120 to receive GPS signals and determines the position using the actual ephemerides based on the GPS signals. In contrast, if the determiner 173 determines that the remaining period from the current time until the expiration time of the predicted ephemerides is longer than the determination period, then the positioner 174 determines the position using the predicted ephemerides acquired from the server.

The positioner 174 determines the position of the user wearing the information processing device 1 based on the GPS signals received at the GPS receiver 120 from the individual GPS satellites 2, and either of the actual ephemerides and the predicted ephemerides.

Specifically, the positioner 174 calculates the distances from the GPS satellites 2 to the information processing device 1, based on the times indicated by the time information contained in the GPS signals and the current time measured at the clock 130. The positioner 174 calculates the distances from at least four GPS satellites 2. The positioner 174 then calculates the positions of the GPS satellites 2, from which the distances are calculated, at the timing of transmission of the GPS signals, based on the actual ephemerides or the predicted ephemerides determined at the determiner 173. Based on the calculated distances from the GPS satellites 2 and the calculated positions of the GPS satellites 2, the positioner 174 calculates the current position (for example, latitude, longitude, and height) of the user wearing the information processing device 1 and thereby determines the position of the user. Such a calculation procedure to determine the position has been well known, as is disclosed in the above-mentioned non-patent literature, and is not explained in detail in this specification.

Figure 3:
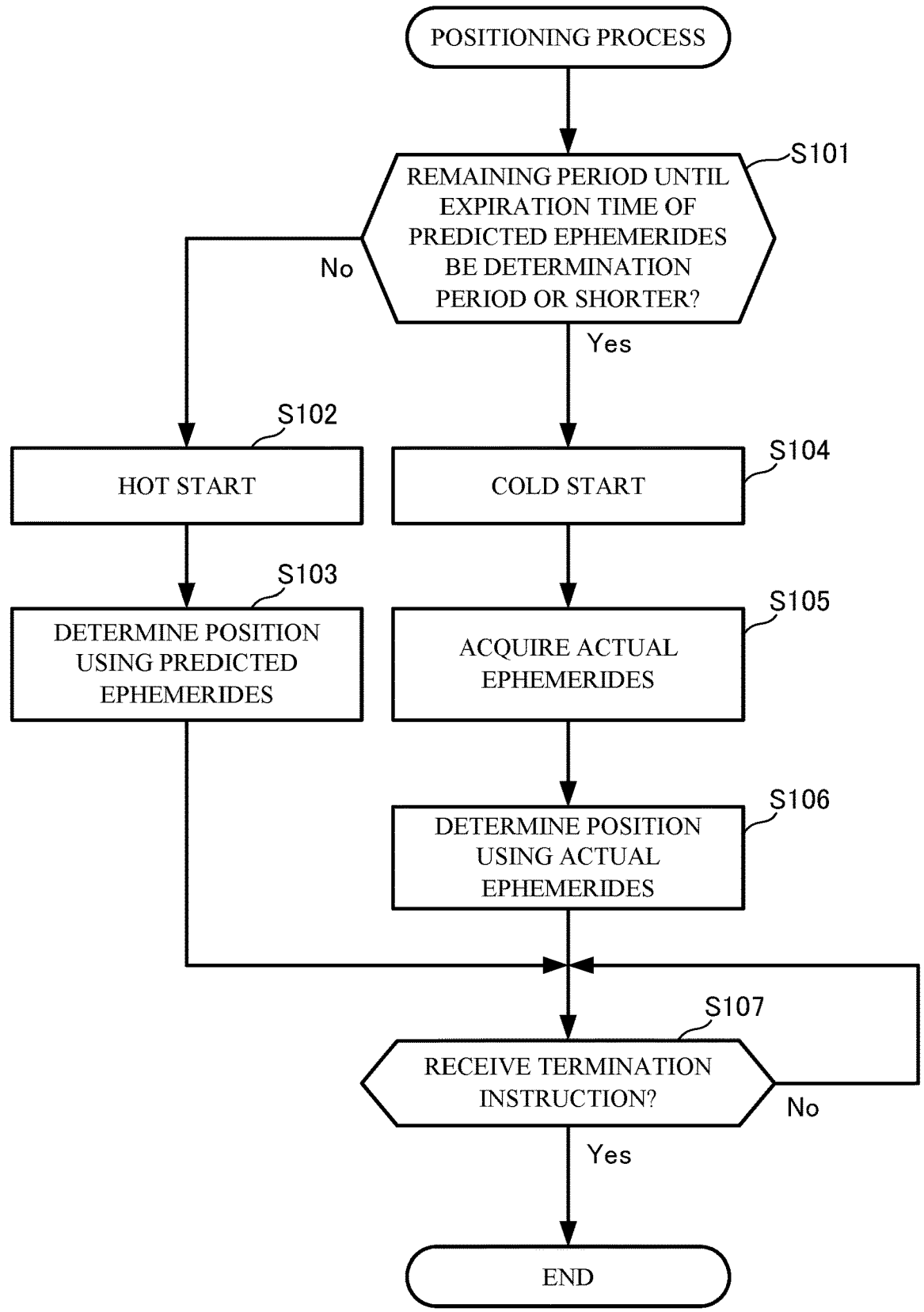
FIG. 3 is a flowchart illustrating a positioning process according to the embodiment of the disclosure.

A positioning process executed in the information processing device 1 will now be explained. A user who participates in a full marathon race manipulates the inputter 140 of the information processing device 1 worn at the waist to provide an instruction to initiate the positioning process to the information processing device 1 immediately before the start of the race, and then starts racing. In response to this instruction, the information processing device 1 executes the positioning process illustrated in FIG. 3.

First, the determiner 173 determines whether the remaining period from the current time until the expiration time of the predicted ephemerides stored in the predicted ephemeris storage DB 162 is the determination period or shorter (Step S101). In this example, the remaining period from the current time until the expiration time of the predicted ephemerides used by the determiner 173 is a period from the current time measured at the clock 130 until the expiration time of the predicted ephemerides.

If the remaining period from the current time until the expiration time of the predicted ephemerides is longer than the determination period (Step S101; No), the controller 170 restarts the information processing device 1 by hot-start reactivation (Step S102). The positioner 174 thus determines the position of the user based on the predicted ephemerides stored in the predicted ephemeris storage DB 162 and the GPS signals caught at the GPS receiver 120 (Step S103). Alternatively, Step S103 may be executed without the hot-start reactivation in Step S102.

In contrast, if the remaining period from the current time until the expiration time of the predicted ephemerides is the determination period or shorter (Step S101; Yes), the controller 170 restarts the information processing device 1 by cold-start reactivation (Step S104). The positioner 174 thus causes the actual ephemeris acquirer 171 to decode the GPS signals caught (received) at the GPS receiver 120 when the remaining period from the current time until the expiration time of the predicted ephemerides is the determination period or shorter, and execute an operation of acquiring the actual ephemerides (Step S105). The acquired actual ephemerides are stored into the actual ephemeris storage DB 161. The positioner 174 then determines the position of the user based on the actual ephemerides acquired in Step S105 and the GPS signals caught at the GPS receiver 120 in Step S106.

The determination of the position of the user started in Steps S102 and S103 or Steps S104 to S106 will be continued during the race of the user. After the race, the user manipulates the inputter 140 to provide an instruction to terminate the positioning process. In response to reception of this instruction (Step S107; Yes), the positioning process is terminated.

Alternatively, instead of the cold-start reactivation (Step S104) executed in every positioning process, the controller 170 may determine whether to execute the reactivation depending on the remaining period from the current time until the expiration time of the actual ephemerides stored in the actual ephemeris storage DB 161. That is, if the remaining period is shorter than the lower limit (for example, 30 minutes), which implies low reliability of the actual ephemerides, then the cold-start reactivation is executed. In contrast, if the remaining period is the lower limit or longer, the stored actual ephemerides are acquired (read) and used to determine the position without the cold-start reactivation.

Needless to say, another procedure may be applied, provided that the position can be determined using the actual ephemerides acquired when the remaining period from the current time until the expiration time of the predicted ephemerides is the determination period or shorter. For example, if the remaining period from the current time until the expiration time of the predicted ephemerides is the determination period or shorter (Step S101; Yes), the controller 170 may delete the actual ephemerides stored in the actual ephemeris storage DB 161 instead of the cold-start reactivation, acquire new actual ephemerides in Step S105, and determine the position using the acquired actual ephemerides (Step S106). Instead of the deletion of the stored actual ephemerides executed in every positioning process, the controller 170 may determine whether to execute the deletion depending on the remaining period from the current time until the expiration time of the stored actual ephemerides, as in the above-explained case of reactivation.

Figure 4:
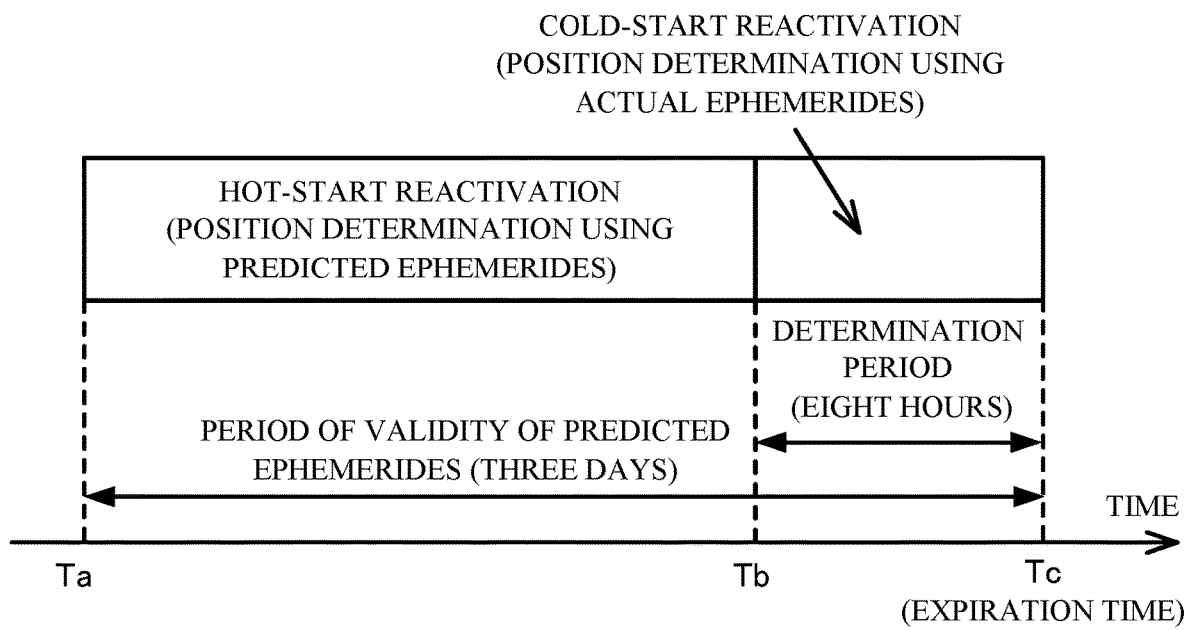
FIG. 4 is a diagram for explaining advantageous effects of the disclosure.

Advantageous effects of the disclosure will now be described with reference to FIG. 4. In FIG. 4, the three days from the time Ta to the time Tc represent a period during which the predicted ephemerides stored in the predicted ephemeris storage DB 162 are valid. The time Tc therefore corresponds to the expiration time of the predicted ephemerides. The time Tb indicates the time the determination period before, that is, eight hours before the expiration time Tc of the predicted ephemeris.

The following explanation assumes a case where the above-explained positioning process is started at a time between the time Ta and the time Tb. In this case, since the remaining period until the expiration time of the predicted ephemerides is longer than the determination period (Step S101 in FIG. 3; No), the information processing device 1 is restarted by hot-start reactivation and determines the position of the user during the race, using the valid predicted ephemerides that have already been stored (Steps S102 and S103). These predicted ephemerides will be valid at least for the determination period, that is, eight hours from the start of the positioning process. That is, the positioning process for the user during the race will not be interrupted due to the expiration of the predicted ephemerides. In addition, the hot-start reactivation in this case can achieve relatively rapid start of the positioning process.

In contrast, the following explanation assumes another case where the positioning process is started at a time between the time Tb and the time Tc. In this case, since the remaining period until the expiration time of the predicted ephemerides is the determination period or shorter (Step S101 in FIG. 3; Yes), the information processing device 1 is restarted by cold-start reactivation and determines the position of the user using the actual ephemerides acquired from the GPS signals, which are caught when the remaining period until the expiration time of the predicted ephemerides is the determination period or shorter (Steps S104 to S106). That is, if the predicted ephemerides are valid at the start of the positioning process but will possibly expire during the race, the information processing device 1 determines the position using the actual ephemerides from the start of the positioning process. This configuration can prevent the positioning process for the user during the race from being interrupted due to the expiration of the predicted ephemerides.

As explained above, if the remaining period until the expiration time of the predicted ephemerides is the determination period or shorter, the information processing device 1 in this embodiment decodes the latest GPS signals caught at the GPS receiver 120 to acquire the actual ephemerides and determines the position based on the acquired actual ephemerides, regardless of the stored valid predicted ephemerides. The information processing device 1 can therefore continue the positioning process for the subject even if the predicted ephemerides expire during the positioning process.

Furthermore, if the remaining period until the expiration time of the predicted ephemerides is longer than the determination period, the information processing device 1 in this embodiment determines the position based on the predicted ephemerides. The information processing device 1 can therefore immediately start the positioning process using the predicted ephemerides if the predicted ephemerides are unlikely to expire during the positioning process.

In addition, the determination period is set to eight hours longer than the maximum term (for example, seven hours corresponding to a typical time limit in a full marathon race), during which the user subject to the positioning process is expected to be in a state of running a race (full marathon) in this embodiment. This configuration can achieve appropriate position determination of the subject based on the actual ephemerides, depending on the relationship between the expiration time of the predicted ephemerides and the period during which the subject is in a certain state.

(Modification)

The above-described embodiment should not be construed as limiting the disclosure and may be provided with various modifications without departing from the gist of the disclosure.

For example, although the information processing device 1 in the above embodiment determines the position of a user in a state of running a full marathon, the user subject to the positioning process in the information processing device 1 may also be in another state. For example, the information processing device 1 may also be applied to the positioning process for a user in a state of running a bicycle race and a user in a state of orienteering. The subject in the positioning process in the information processing device 1 should not necessarily be a human and may also be an animal, such as running horse, or an automobile.

Figure 5:
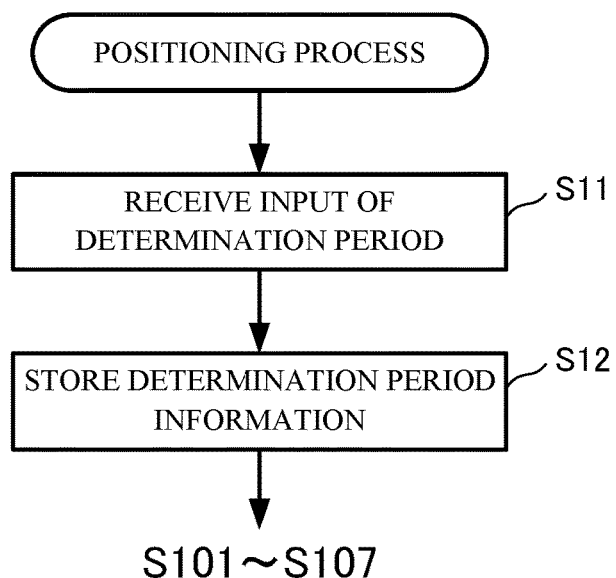
FIG. 5 is a flowchart illustrating a positioning process according to a first modification of the embodiment of the disclosure.

The determination period of eight hours in the above embodiment is a mere example. For example, the controller 170 may execute the positioning process illustrated in FIG. 5 and allow the user to set the determination period in the positioning process.

In this positioning process, the controller 170 first receives input of a determination period from the user or the external device 3 via the inputter 140 or the communicator 110 (Step S11). The controller 170 then stores determination period information 163 indicating the received determination period into the storage 160 (Step S12). In the case where the determination period information 163 has already been stored in the storage 160, the controller 170 updates the stored determination period information 163 to the determination period information 163 indicating the received determination period. This process is followed by steps substantially identical to Steps S101 to S107 in FIG. 3. The user is therefore able to set the determination period appropriately for the own activities. It should be noted that only the above-explained Steps S11 and S12 may be executed alone and independently from the positioning process.

Figures 6, 7:
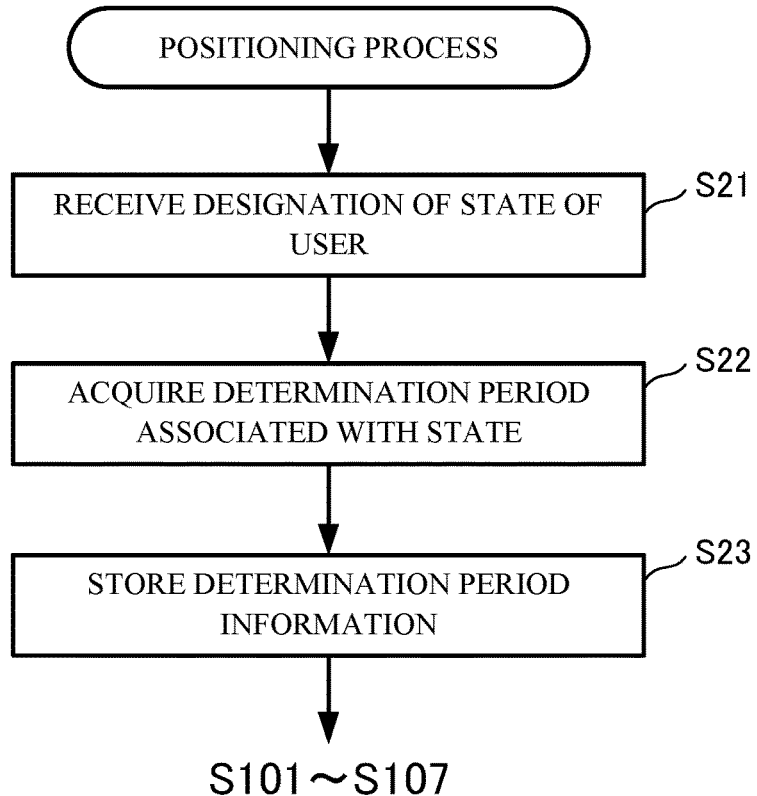
FIG. 6 illustrates an exemplary configuration of a determination period setting table.
FIG. 7 is a flowchart illustrating a positioning process according to a second modification of the embodiment of the disclosure.

Alternatively, the controller 170 may receive designation of a state of the user, which is the subject in the positioning process in the information processing device 1, from the user or the external device 3 via the inputter 140 or the communicator 110, and may set the determination period to the time associated with the designated state. For example, the storage 160 may preliminarily store a determination period setting table illustrated in FIG. 6. The controller 170 may execute a positioning process illustrated in FIG. 7 and refer to the determination period setting table, to thereby set the determination period associated with the designated state of the user.

In this positioning process, the controller 170 first receives designation of a state of the user from the user or the external device 3 via the inputter 140 or the communicator 110 (Step S21). The controller 170 then refers to the determination period setting table illustrated in FIG. 6 and acquires the determination period associated with the designated state of the user (Step S22). In an exemplary case where the state of the user is designated as a state of running a "5-km marathon", the controller 170 acquires the determination period of "1 hour". The controller 170 then stores determination period information 163 indicating the acquired determination period into the storage 160 (Step S23). In the case where the determination period information 163 has already been stored in the storage 160, the controller 170 updates the stored determination period information 163 to the determination period information 163 indicating the acquired determination period. This process is followed by steps substantially identical to Steps S101 to S107 in FIG. 3. The determination period can therefore be set to a period appropriately for the state of the user subject to the positioning process. It should be noted that only the above-explained Steps S21 to S23 may be executed alone and independently from the positioning process.

Figure 8:
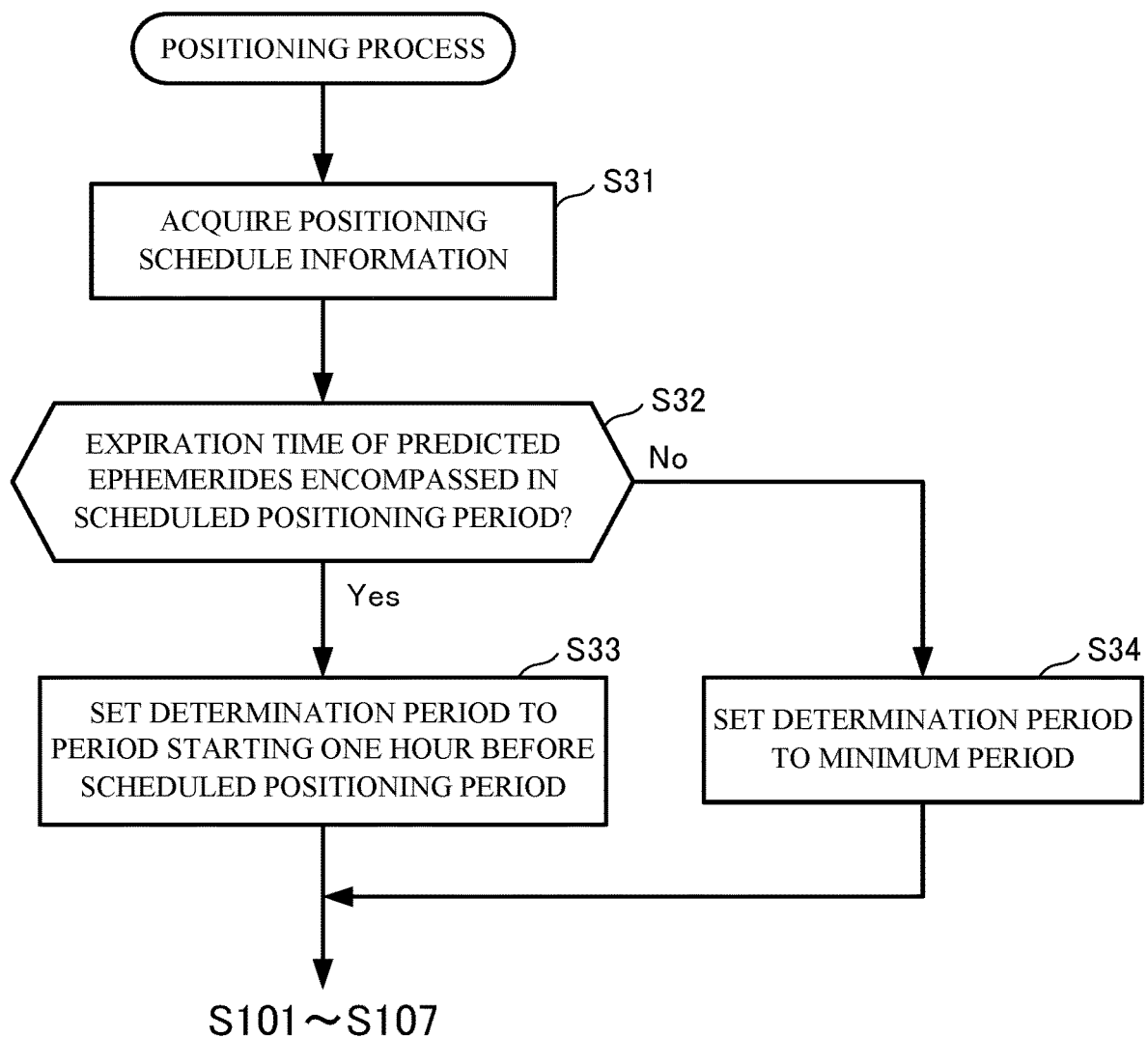
FIG. 8 is a flowchart illustrating a positioning process according to a third modification of the embodiment of the disclosure.

Alternatively, the controller 170 may receive designation of positioning schedule information indicating a scheduled positioning period during which the positioning process is planned to be conducted, from the user or the external device 3 via the inputter 140 or the communicator 110, set the determination period based on the designated positioning schedule information, and conduct the positioning process based on the set determination period. FIG. 8 is a flowchart of this positioning process.

In this positioning process, the controller 170 first acquires positioning schedule information via the inputter 140 or the communicator 110 (Step S31). In the case where the positioning schedule information has already been stored in the storage 160, the controller 170 may acquire this positioning schedule information. The controller 170 then determines whether the scheduled positioning period indicated by the acquired positioning schedule information encompasses the expiration time of the predicted ephemerides (Step S32).

If the scheduled positioning period encompasses the expiration time of the predicted ephemerides (Step S32; Yes), the controller 170 sets the determination period such that the determination period starts at a time one hour before the time of start of the scheduled positioning period (Step S33). The time of start of the scheduled positioning period is therefore always encompassed in the determination period in the case where the predicted ephemerides can expire during the scheduled positioning period. The setting of "one hour" before the time of start of the scheduled positioning period is a mere example and may be another sufficient term (for example, "30 minutes") provided that the time of start of the scheduled positioning period is encompassed in the determination period. This process is followed by steps substantially identical to Steps S101 to S107 in FIG. 3.

In contrast, if the scheduled positioning period does not encompass the expiration time of the predicted ephemerides (Step S32; No), the controller 170 sets the determination period to the predefined minimum period (for example, one hour) (Step S34). A long determination period is not required because the predicted ephemerides cannot expire during the scheduled positioning period. The determination period may also be set to 0. This process is followed by steps substantially identical to Steps S101 to S107 in FIG. 3. It should be noted that only the above-explained Steps S31 to S34 may be executed alone and independently from the positioning process.

Figure 9A:
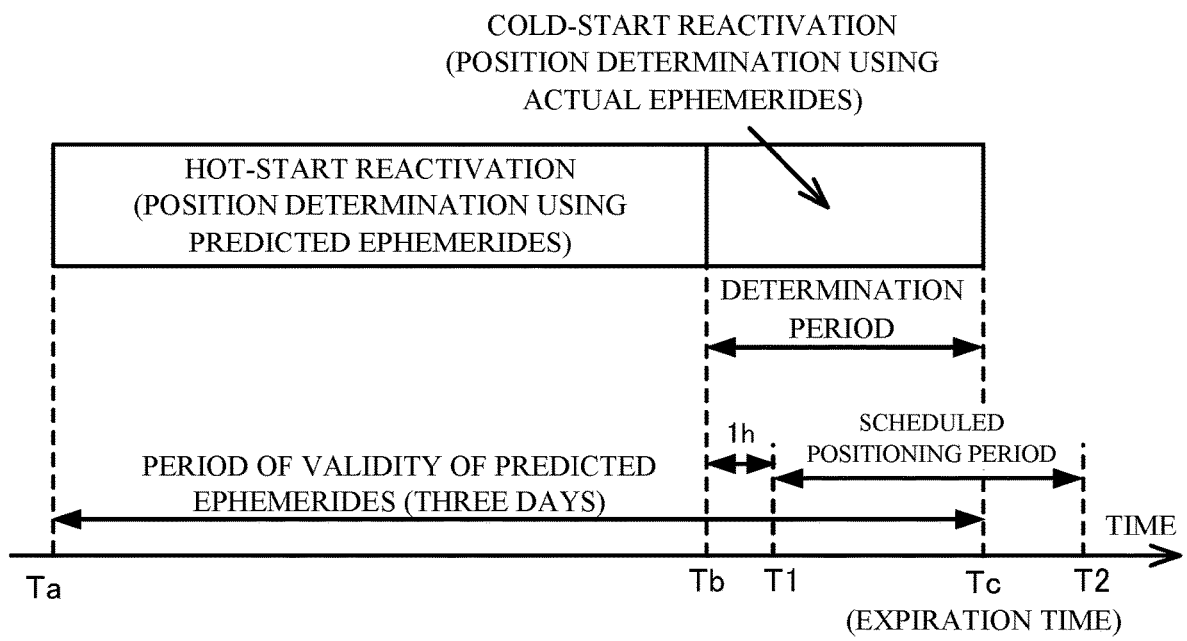
FIG. 9A is a diagram for explaining a first example of a determination period set in accordance with positioning schedule information.

A specific example of the above-explained positioning process will now be explained. For example, as illustrated in FIG. 9A, if the scheduled positioning period between the time T1 and the time T2 indicated by the positioning schedule information encompasses the expiration time Tc of the predicted ephemeris (Step S32 in FIG. 8; Yes), then the controller 170 sets the determination period to the period from the time Tb one hour before the time T1 of start of the scheduled positioning period until the time Tc (Step S33). This setting causes the positioning process to be conducted based on the actual ephemerides during the scheduled positioning period, so that the positioning process can be continued regardless of expiration of the predicated ephemerides during the process.

Figure 9B:
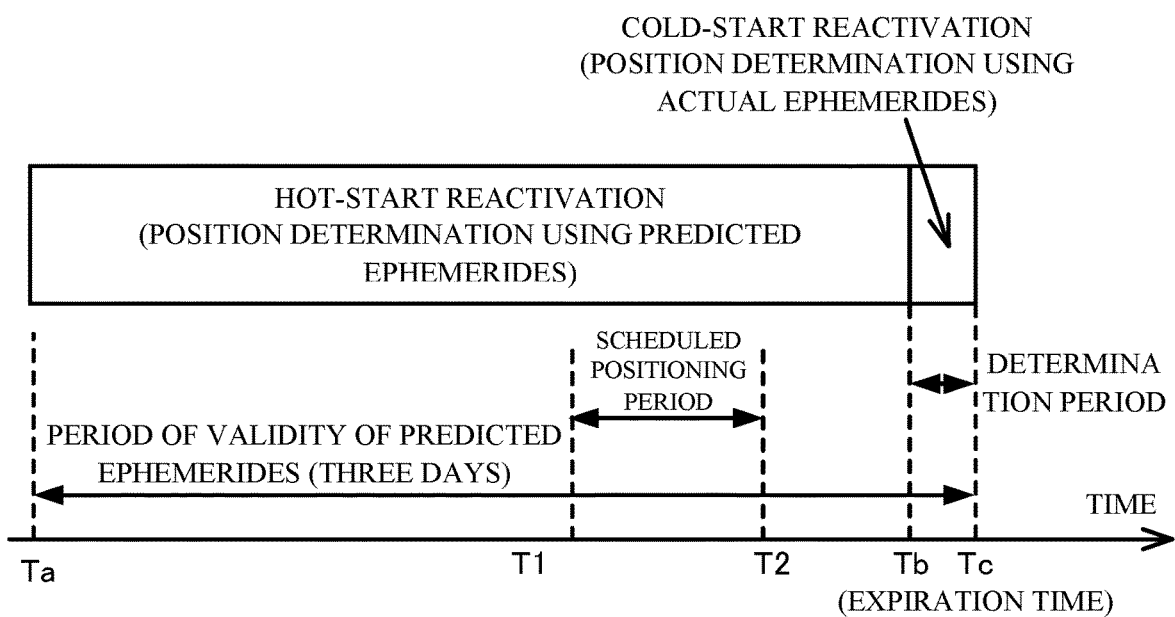
FIG. 9B is a diagram for explaining a second example of a determination period set in accordance with positioning schedule information.

In contrast, as illustrated in FIG. 9B, if the scheduled positioning period between the time T1 and the time T2 indicated by the positioning schedule information does not encompass the expiration time Tc of the predicted ephemerides (Step S32 in FIG. 8; No), then the controller 170 sets the determination period to the minimum determination period (for example, 60 minutes) from the time Tb to the time Tc (Step S34). This setting causes the positioning process to be conducted based on the predicted ephemerides after the hot-start reactivation, thereby achieving rapid start of the positioning process, in the case where the predicted ephemerides cannot expire during the scheduled positioning period.

Although the remaining period from the current time until the expiration time of the predicted ephemerides is a period from the current time measured at the clock 130 until the expiration time of the predicted ephemerides in the above embodiment, the determination may be executed using counter values calculated as explained below. First, the period of validity of the predicted ephemerides acquired from the server is divided by a certain unit time (for example, one minute) to yield a counter value. This counter value is decremented by one in response to every lapse of the certain unit time from the timing of acquisition of the predicted ephemerides from the server, in accordance with the basic clock signal generated at the clock 130, to provide the counter value corresponding to the remaining period until the expiration time of the predicted ephemerides. In this case, the determination period is also divided by the unit time and thus converted into a counter value. Although the "remaining period" and the "determination period" are recited in the form of "periods" in the claims, these periods may also be defined in the form of the counter values within the scope of the disclosure.

Although the predicted ephemerides are acquired from the server, which is an external apparatus, in the above embodiment, the predicted ephemerides may also be calculated in the information processing device 1. A procedure for calculating predicted ephemerides is well known and thus is not explained in detail in this specification.

The positioning process may also be conducted in an available system of a similar type other than the GPS. Examples of the system include the global navigation satellite system (GLONASS) of Russian Federation, the Galileo navigation satellite system of the European Union (EU), the BeiDou/Compass navigation satellite system of the People's Republic of China, and the Indian regional navigation satellite system (IRNSS) of India.

The above-explained series of processing may be executed by hardware or software. In other words, the functional configuration illustrated in FIG. 2 is a mere example and should not be construed as limiting the disclosure. That is, the information processing device 1 is only required to have functions for executing the above-explained series of processing as a whole, and may have another configuration of functional blocks for performing these functions other than the exemplary configuration illustrated in FIG. 2.

A single functional block may be achieved by hardware alone, software alone, or a combination of hardware and software.

The functional configuration in the above embodiment is achieved by the processer that executes calculations. Examples of the processor applicable to the embodiment include various processing devices alone, such as single processors, multiprocessors, and multicore processors, and combinations of these processing devices and processing circuits, such as application specific integrated circuits (ASICs) and field-programmable gate arrays (FPGAs).

The individual functions of the information processing device 1 may also be performed by an ordinary computer. Specifically, although the program for the positioning process executed in the information processing device 1 is preliminarily stored in the ROM of the controller 170 in the above embodiment, the program may also be stored in a computer-readable recording medium, such as flexible disk, compact disc read-only memory (CD-ROM), digital versatile disc (DVD), magneto-optical disc (MO), memory card, or universal serial bus (USB) memory, for distribution, and may be installed into the computer, thereby enabling the computer to perform the above-explained functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information processing device capable of being carried by a subject, the information processing device comprising:
    an antenna configured to receive positioning signals for a positioning process from navigation satellites; and
    at least one processor configured to:
        acquire, based on the received positioning signals, actual ephemerides that are actual orbital information on the navigation satellites;
        acquire predicted ephemerides that are predicted orbital information on the navigation satellites and have a predefined expiration time;
        before the predefined expiration time, determine whether a remaining period until the predefined expiration time is a determination period or shorter, the determination period being set to at least a maximum term during which the subject is expected to be in a certain state, wherein the determination period is shorter than a period of validity of the predicted ephemerides and longer than a period of validity of the actual ephemerides; and
        execute an actual ephemeris acquiring operation that is based on the positioning signals received when determination is made that the remaining period until the predefined expiration time is the determination period or shorter, and determine a position of the subject based on the positioning signals and the actual ephemerides acquired through the actual ephemeris acquiring operation.

2. The information processing device according to claim 1, wherein the predicted ephemerides have a period of validity longer than a period of validity of the actual ephemerides.

3. The information processing device according to claim 1, wherein when determination is made that the remaining period until the predefined expiration time is longer than the determination period, the at least one processor determines the position of the subject based on the acquired predicted ephemerides.

4. The information processing device according to claim 1, wherein the at least one processor is able to set the determination period.

5. The information processing device according to claim 4, wherein the at least one processor sets the determination period to a period associated with a designated state of the subject.

6. The information processing device according to claim 4, wherein the at least one processor sets the determination period to a period associated with a behavior of the subject.

7. The information processing device according to claim 4, wherein the at least one processor sets the determination period based on positioning schedule information indicating a period during which the positioning process for the subject is planned to be conducted.

8. A positioning method for an information processing device carried by a subject, the positioning method comprising the information processing device at least performing:
    acquiring, by at least one processor, based on positioning signals for a position process received by an antenna of the information processing device from navigation satellites, actual ephemerides that are actual orbital information on the navigation satellites;
    acquiring, by the at least one processor, predicted ephemerides that are predicted orbital information on the navigation satellites and having a predefined expiration time;
    before the predefined expiration time, determining, by the at least one processor, a remaining period until the predefined expiration time is a determination period or shorter, the determination period being set to at least a maximum term during which the subject is expected to be in a certain state, wherein the determination period is shorter than a period of validity of the predicted ephemerides and longer than a period of validity of the actual ephemerides; and
    executing, by the at least one processor, an actual ephemeris acquiring operation that is based on the positioning signals received after determining that the remaining period until the predefined expiration time is the determination period or shorter, and determining a position of the subject based on the positioning signals and the actual ephemerides acquired through the actual ephemeris acquiring operation.

9. A non-transitory computer-readable recording medium, storing a program causing an information processing device carried by a subject to:
    acquire, based on positioning signals for a position process received by an antenna of the information processing device from navigation satellites, actual ephemerides that are actual orbital information on the navigation satellites;

acquire predicted ephemerides that are predicted orbital information on the navigation satellites and have a predefined expiration time;

before the predefined expiration time, determine a remaining period until the predefined expiration time is a determination period or shorter, the determination period being set to at least a maximum term during which the subject is expected to be in a certain state, wherein the determination period is shorter than a period of validity of the predicted ephemerides and longer than a period of validity of the actual ephemerides; and execute an actual ephemeris acquiring operation that is based on the positioning signals received after determining that the remaining period until the predefined expiration time is the determination period or shorter, and determine a position of the subject based on the positioning signals and the actual ephemerides acquired through the actual ephemeris acquiring operation.

\* \* \* \* \*